United States Patent
Trenbeath et al.

(10) Patent No.: US 7,373,602 B2
(45) Date of Patent: May 13, 2008

(54) METHOD FOR READING ELECTRONIC MAIL IN PLAIN TEXT

(75) Inventors: Brian L. Trenbeath, Redmond, WA (US); Robert C. J. Pengelly, Redmond, WA (US); Henrieta Slugenova, Issaquah, WA (US); Liza Cardenas, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 10/446,243

(22) Filed: May 28, 2003

(65) Prior Publication Data

US 2004/0243926 A1   Dec. 2, 2004

(51) Int. Cl.
   *G06F 15/00* (2006.01)
(52) U.S. Cl. ............... 715/523; 715/513; 715/530; 709/206
(58) Field of Classification Search ......... 715/501.1, 715/522–523, 516, 752, 515, 513; 709/526, 709/206
   See application file for complete search history.

(56) References Cited

U.S. PATENT DOCUMENTS

| | | | | |
|---|---|---|---|---|
| 5,818,447 | A * | 10/1998 | Wolf et al. | 715/752 |
| 5,826,062 | A * | 10/1998 | Fake et al. | 715/513 |
| 5,848,415 | A * | 12/1998 | Guck | 707/10 |
| 6,519,630 | B1 * | 2/2003 | Hanawa | 709/206 |
| 6,629,130 | B2 * | 9/2003 | Mertama et al. | 709/206 |
| 6,640,301 | B1 * | 10/2003 | Ng | 713/156 |
| 6,665,709 | B1 * | 12/2003 | Barron | 709/217 |
| 6,728,757 | B1 * | 4/2004 | Friend | 709/206 |
| 7,130,886 | B2 * | 10/2006 | Little et al. | 709/206 |
| 7,139,399 | B1 * | 11/2006 | Zimmermann | 380/277 |
| 2002/0178353 | A1 * | 11/2002 | Graham | 713/151 |
| 2002/0194286 | A1 * | 12/2002 | Matsuura et al. | 709/206 |
| 2003/0014492 | A1 * | 1/2003 | Premutico | 709/206 |
| 2003/0084093 | A1 * | 5/2003 | Grason et al. | 709/203 |
| 2003/0167311 | A1 * | 9/2003 | Kirsch | 709/206 |
| 2003/0204720 | A1 * | 10/2003 | Schoen et al. | 713/153 |
| 2003/0208547 | A1 * | 11/2003 | Branimir | 709/206 |
| 2003/0217259 | A1 * | 11/2003 | Wong et al. | 713/153 |
| 2004/0003235 | A1 * | 1/2004 | Musa | 713/155 |
| 2004/0133644 | A1 * | 7/2004 | Warren et al. | 709/206 |
| 2004/0139163 | A1 * | 7/2004 | Adams et al. | 709/206 |
| 2004/0199594 | A1 * | 10/2004 | Radatti et al. | 709/206 |
| 2004/0205330 | A1 * | 10/2004 | Godfrey et al. | 713/150 |
| 2004/0230700 | A1 * | 11/2004 | Oomori | 709/247 |

OTHER PUBLICATIONS

Microsoft Outlook, copyright 1999, pp. 1-20.*

* cited by examiner

*Primary Examiner*—Thu Huynh
(74) *Attorney, Agent, or Firm*—Merchant & Gould

(57) ABSTRACT

It may be determined whether text of an electronic mail message is in a format other than plain text. If the text of the electronic mail message is in a format other than plain text, the text may be converted to a plain text format for displaying. If the text of the electronic mail message is in a format other than plain text format and the electronic mail message contains a digital signature, converting the text of the electronic mail message to plain text including breaking the digital signature. Also, a message may be provided to a user to indicates that the electronic mail message is in a format other than plain text format, immediate display of the electronic mail message may be prevented, and an option of viewing the text of the electronic mail message in a non-plain text format or a plain text format may be provided.

30 Claims, 9 Drawing Sheets

METHOD FOR READING ELECTRONIC MAIL IN PLAIN TEXT

FIELD OF THE INVENTION

The present invention relates to systems and methods for converting text of an electronic mail message in a non-plain text format to text in a plain text format.

BACKGROUND OF THE INVENTION

There has been considerable effort in recent years to enhance the security of electronic mail. Junk emails, also referred to as "spam," have unfortunately become a component of the Internet that users must deal with carefully. Although some junk emails are easily detected by a user as being junk emails, other junk emails are disguised such that a user opens the email without knowing the true origin or the contents of the email, leading to potential exposure to computer bugs and/or viruses. Further, with the additional capabilities of hypertext markup language (HTML) and rich text format (RTF), incoming emails potentially pose a greater threat and unacceptable risks to users. Some users have concerns, whether real or imagined, when opening emails in HTML or RTF formats due to potential exposure to computer bugs or viruses from an email author.

Accordingly, there is a need in the art to provide enhanced security to users that receive electronic mail messages.

SUMMARY OF THE INVENTION

The present invention addresses some of the difficulties and problems discussed above by the discovery of a method of providing to a user an option to convert text of an electronic mail message in a non-plain text format to text in a plain text format. The method provides reassurance to some users that the text of the electronic mail in plain text format reduces the risk associated with opening and viewing the contents of an incoming electronic mail message.

Accordingly, the present invention is directed to a method for converting electronic mail to a plain text format, wherein the method comprises (a) determining whether text of an electronic mail message is in a format other than plain text; and (b) if the text of the electronic mail message is in a format other than plain text, converting the text to a plain text format. The method may further include one or more additional steps such as displaying the text of the electronic mail message in the plain text format, providing a message to a user that the electronic mail message is in a format other than plain text format, preventing immediate display of the electronic mail message, providing an option of viewing the text of the electronic mail message in a non-plain text format or a plain text format, and after the step of converting the text to a plain text format, providing a message to a user that the text of the electronic mail message has been converted to plain text format, and displaying the text of the electronic mail in plain text format.

The present invention is further directed to a tools option available to a user of a software application, wherein the tools option allows the user to activate or deactivate a step of converting electronic mail text in a non-plain text format to text in a plain text format. The tools option may be accessible to a user via an email option page, so that the user may activate (e.g., check a box for this particular feature) or deactivate (e.g., remove a check from a box for this particular feature) the "Read Mail As Plain Text" feature.

The present invention is also directed to a computer readable medium having stored thereon computer-executable instructions for performing a method of converting text of an electronic mail message to a plain text format, wherein the method comprises (a) determining whether text of an electronic mail message is in a format other than plain text; and (b) if the text of the electronic mail message is in a format other than plain text, converting the text to a plain text format. In addition, the present invention is directed to a computing system containing at least one application module usable on the computing system, wherein the at least one application module comprises application code for performing the above-described method of converting text of an electronic mail message to a plain text format.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a method for converting text of an electronic mail message in a non-plain text format into text in a plain text format. The text conversion method of the present invention comprises (a) determining whether text of an electronic mail message is in a format other than plain text; and (b) if the text of the electronic mail message is in a format other than plain text, converting the text to a plain text format. The method may further comprise providing a tools option to a user of a software application, wherein the tools option allows the user to activate or deactivate a step of converting electronic mail text in a non-plain text format to text in a plain text format. The present invention is also directed to a computer readable medium having stored thereon computer-executable instructions for performing the above-described text conversion method, and a computing system containing at least one application module usable on the computing system, wherein the at least one application module comprises application code for performing the above-described text conversion method.

An exemplary computer system and exemplary operating environment for practicing the present invention is described below.

Exemplary Operating Environment

Figure 1:
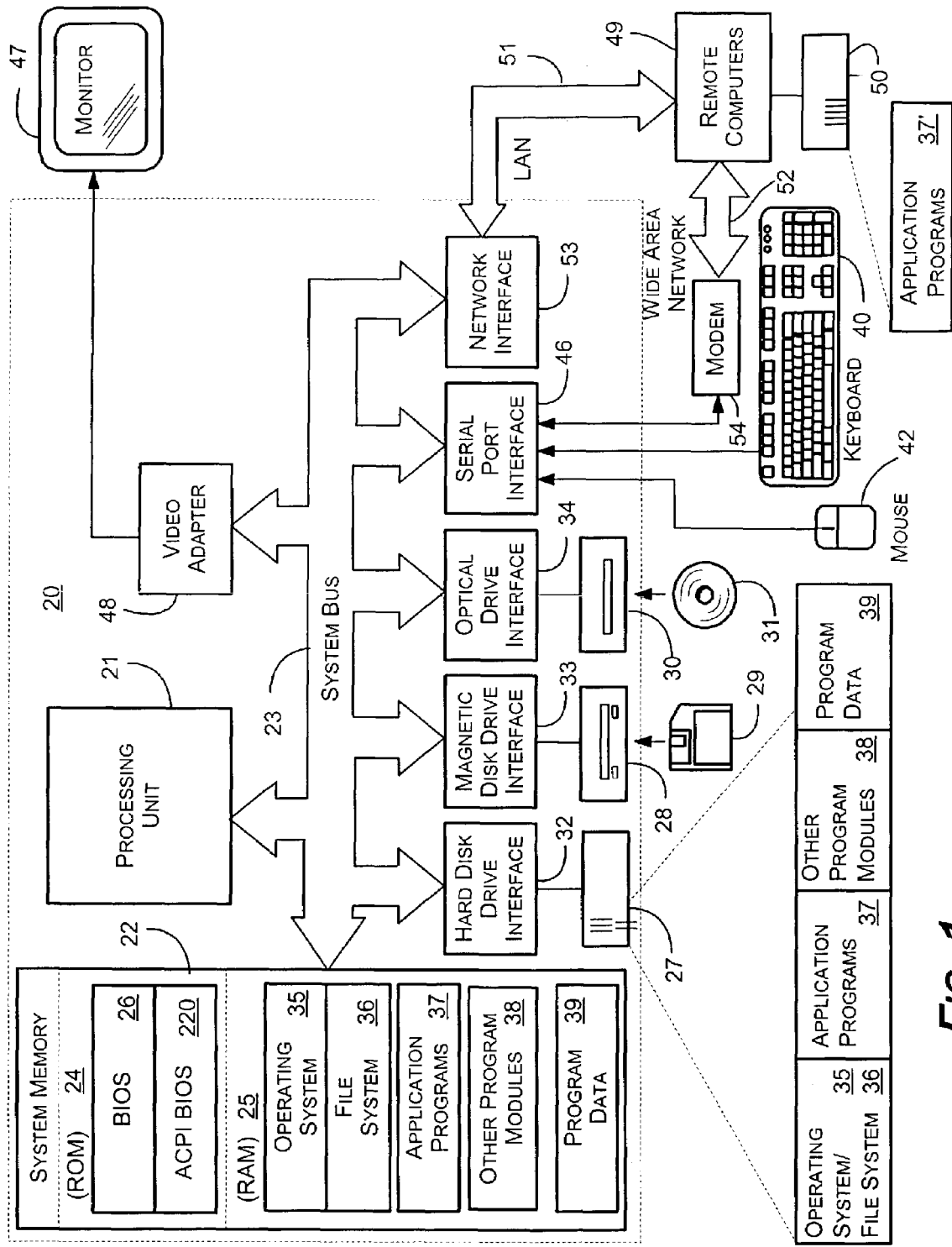
FIG. 1 is a flow diagram of some of the primary components of an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 (not shown) may be stored in the RAM 25 and/or hard drive 27 of the personal computer 20.

A number of program modules may be stored on hard disk 27, magnetic disk 29, optical disk 31, ROM 24, or RAM 25, including an operating system 35, an application program module 36, other program modules 37, and program data 38. Program modules include, but are not limited to, routines, sub-routines, programs, objects, components, data structures, etc., which perform particular tasks or implement particular abstract data types. Aspects of the present invention may be implemented as an integral part of an application program module 36 or as a part of another program module 37.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A monitor 47 or other type of display device may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

Implementation of Exemplary Embodiments of the Present Invention

As described above, the present invention is directed to a method for converting text in an electronic mail message from a non-plain text format to a plain text format. Exemplary embodiments of the present invention are described below.

I. The "Read Text as Plain Text" Feature

The present invention provides a "Read Mail as Plain Text" feature, which enables users to avoid any risks, whether real or imagined, associated with incoming electronic mail messages (i.e., e-mails) in HTML or RTF text. The "Read Mail As Plain Text" feature of the present invention, when activated, automatically converts text of an electronic mail message in a non-plain text format (i.e., HTML or RTF format) to a plain text format. The format of the electronic mail message is converted prior to displaying the contents of the electronic mail message. Further, the text conversion and display of the electronic mail message in a plain text format does not affect the original electronic mail message that was received. Consequently, if given the option, a user may still be able to receive and read the original electronic mail message that was received in its original format, such as a non-plain text format.

When a user previews or opens an electronic mail message in the present invention, the "Read Mail As Plain Text" feature automatically activates prior to displaying the contents of the electronic mail to the user. That is, the "Read Mail As Plain Text" feature automatically converts non-plain text formatted text into plain text formatted text prior to displaying the contents of the e-mail to the user when the "Read Mail as Plain Text" feature has been activated by a user.

As described below, in some embodiments of the present invention, users may be given the option to activate or deactivate the "Read Mail As Plain Text" feature of the present invention. In other embodiments of the present invention, the "Read Mail As Plain Text" feature is automatically activated as a default mode upon opening an electronic mail application, such as Microsoft's Outlook® application. In still other embodiments of the present invention, a company or agency administrator may prohibit users from deactivating the "Read Mail As Plain Text" feature in order to enforce a company wide or agency wide policy regarding the conversion of all non-plain text e-mails to a plain text format.

Figure 2:
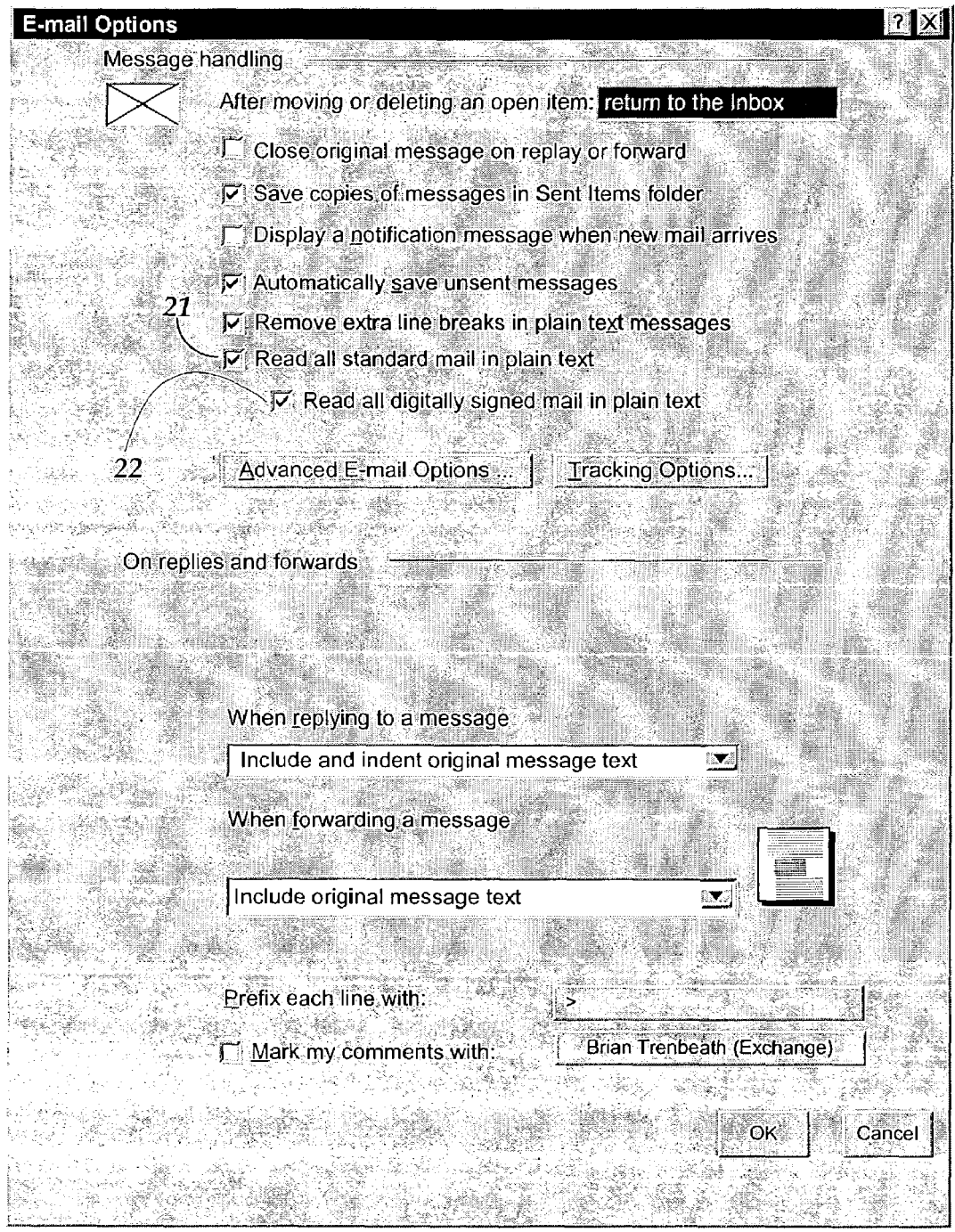
FIG. 2 depicts an exemplary email options box for providing an option to a user to read all standard mail and all digitally signed mail in a plain text format.

In embodiments of the present invention wherein a user is given an option to activate or deactivate the "Read Mail As Plain Text" feature, the user is provided with a mechanism for activating or deactivating the "Read Mail As Plain Text" feature. One such exemplary mechanism is shown in FIG. 2. FIG. 2 depicts an exemplary e-mail options box for providing the "Read Mail As Plain Text" feature to the user. As shown in FIG. 2, e-mail options box 20 contains options box 21 entitled "Read all standard mail in plain text" and options box 22 entitled "Read all digitally signed mail in plain text." If a user or administrator wants to activate the "Read Mail As Plain Text" feature of the present invention, the user or administrator simply checks options box 21. Further, if a user or administrator wants all digitally signed e-mails to be presented in a plain text format, the user or administrator simply checks options box 22.

In one desired embodiment of the present invention, options box 22 entitled "Read all digitally signed mail in plain text" is subordinate to options box 21 entitled "Read all standard mail in plain text." In other words, options box 22 may only be enabled when options box 21 is checked. In this embodiment, a user cannot choose to read all digitally signed e-mails in a plain text format, while reading all standard e-mails (e.g., e-mails that are not digitally signed) in a non-plain text format.

If options box 21 as shown in FIG. 2 is checked, the "Read Mail As Plain Text" feature checks to see if the incoming message has been digitally signed. If the incoming message has not been digitally signed, the "Read Mail As Plain Text" feature automatically processes the e-mail message through a text converter, such as a HTML to plain text converter or a RTF to plain text converter. Once converted, the text is displayed in a plain text format. If both options box 21 and options box 22 are checked, and the incoming e-mail message is digitally signed, the "Read Mail As Plain Text" feature proceeds to the text conversion step and the display step as described above.

During the text conversion step, a copy of the incoming e-mail message is typically sent to a text converter, such as an executable routine in a dynamic-link library (DLL), converted, and returned to the email application, such as Microsoft's Outlook® application. The original e-mail message may be stored in a storage file of the e-mail application on a user's machine, on a server during the text conversion step, or both locally and on a server. Typically, the converted e-mail message is not automatically saved by the method of the present invention; however, a user may choose to save the converted message, if so desired, by using a save function.

The present invention is further directed to a tools option available to a user of a software application, such as the exemplary tools option shown in FIG. 2, wherein the tools option allows the user to activate or deactivate a step of converting electronic mail text in a non-plain text format to text in a plain text format. The tools option may be accessible to a user via an email option page, so that the user may activate (e.g., check a box for this particular feature) or deactivate (e.g., remove a check from a box for this particular feature) the "Read Mail As Plain Text" feature.

Figure 3A:
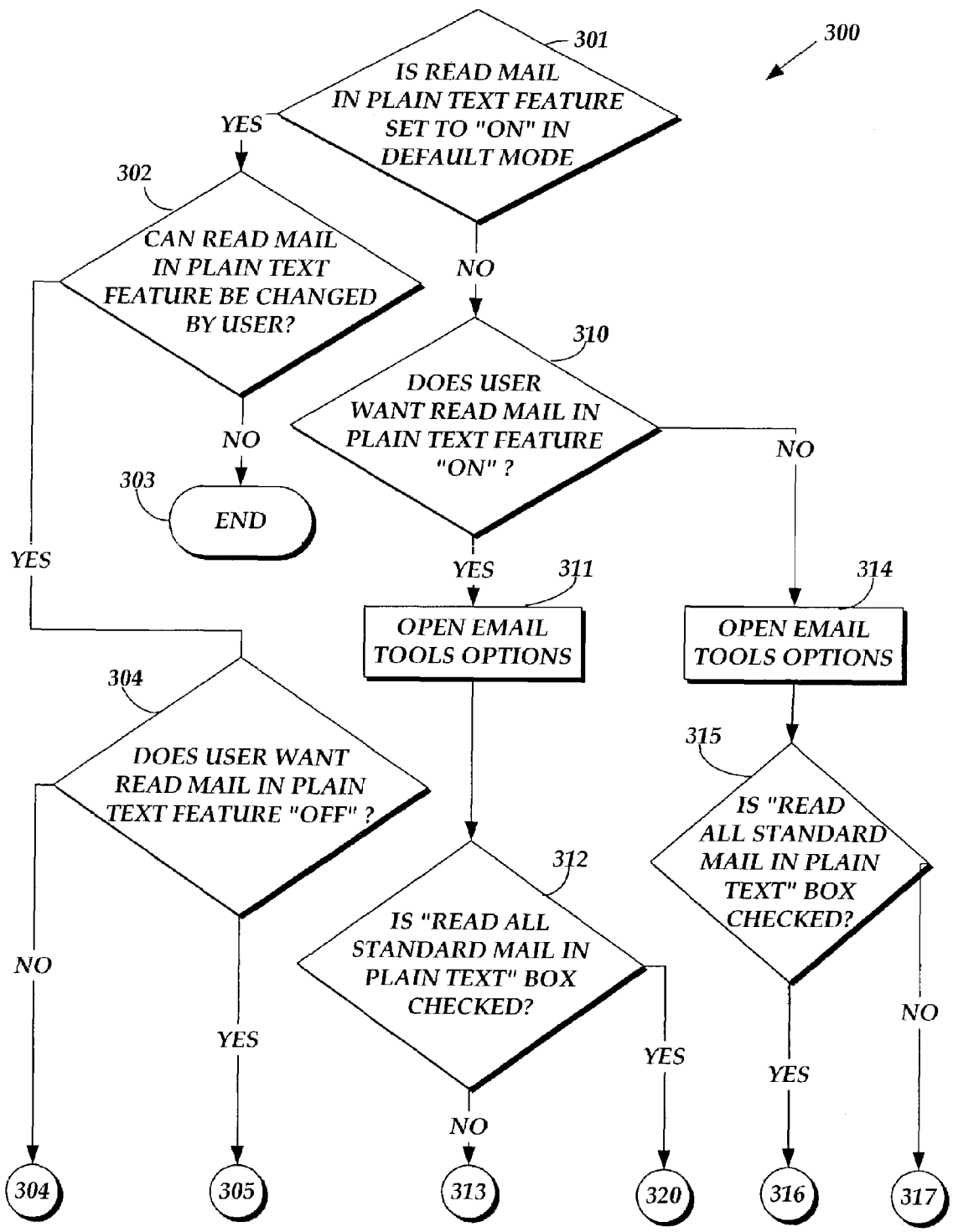
FIGS. 3A-3B depict a flow diagram showing exemplary steps available to a user for reading mail in a plain text format or a non-plain text format.
Figure 3B:
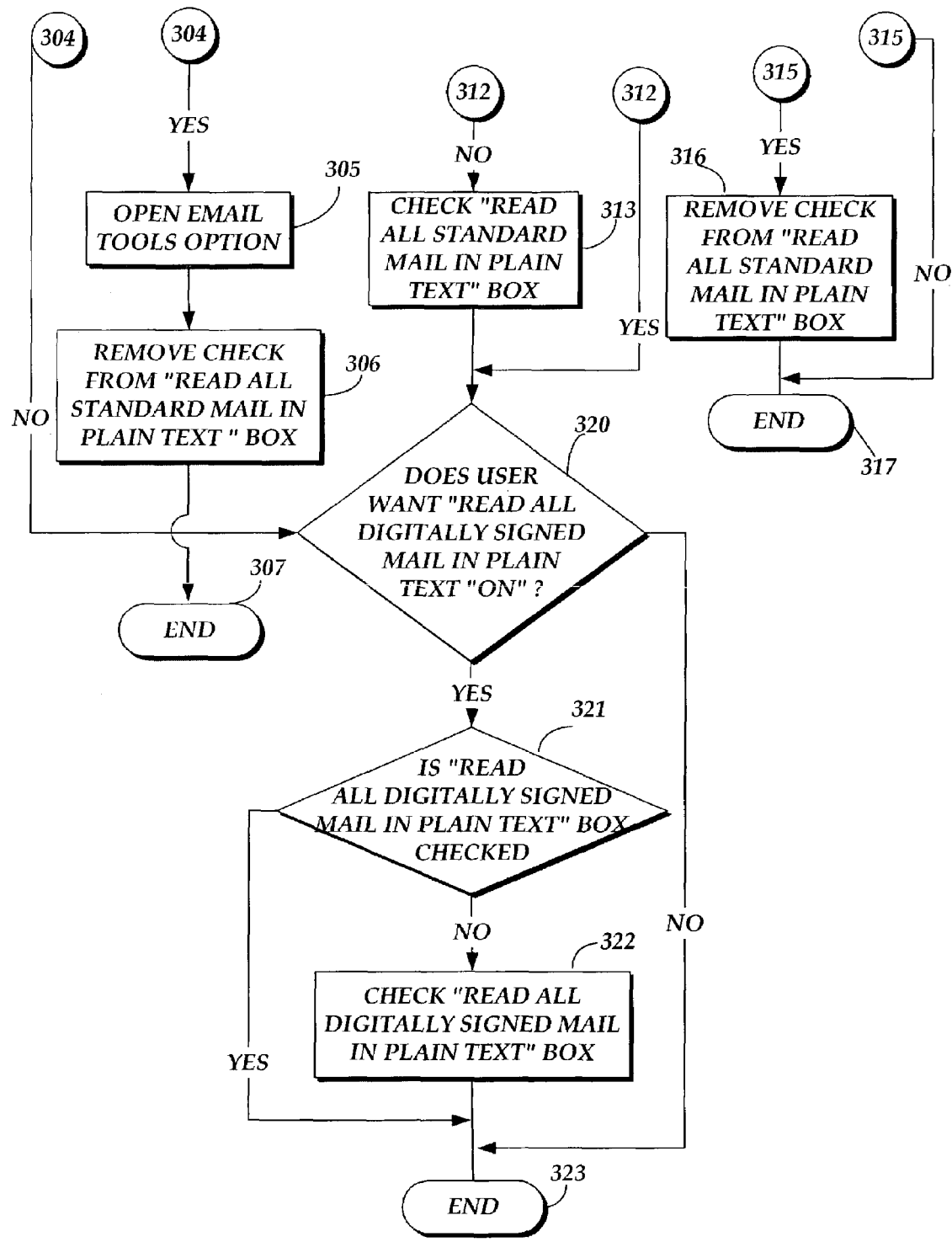

FIGS. 3A-3B provide a flow diagram showing exemplary steps available to a user for activating and/or deactivating the "Read Mail As Plain Text" feature of the present invention. As shown in FIG. 3A, flow process 300 begins at decision block 301. In decision block 301, a determination is made as to whether the "Read Mail As Plain Text" feature is set to an "on" position in a default mode. If the "Read Mail As Plain Text" feature is set to "on" in a default mode, flow process 300 proceeds to decision block 302. At decision block 302, a determination is made as to whether the "Read Mail As Plain Text" feature can be changed by a user. As discussed above, in some embodiments of the present invention, a company or agency may have a policy prohibiting users from deactivating the "Read Mail As Plain Text" feature. If such a policy exists, flow process 300 proceeds from decision block 302 to end block 303. If a user can change the "Read Mail As Plain Text" feature, the process proceeds to decision block 304.

At decision block 304, a determination is made as to whether a user wants the "Read Mail As Plain Text" feature turned off. If a user wants to deactivate the "Read Mail As Plain Text" feature, the process proceeds to step 305 (FIG. 3B), wherein a user opens an e-mail tools option box, such as exemplary e-mail options box 20 described above (see FIG. 2). The process proceeds from step 305 to step 306, wherein a user removes the check from the "Read all standard mail in plain text" box (e.g., options box 21 as shown in FIG. 2). Process 300 then proceeds to end block 307.

Returning to decision block 304 of FIG. 3A, if a user does not want the "Read Mail As Plain Text" feature turned off, flow process 300 proceeds to decision block 320 shown in FIG. 3B.

Returning to decision block 301 of FIG. 3A, if the "Read Mail As Plain Text" feature is not set to an "on" position in a default mode, flow process 300 proceeds to decision block 310. At decision block 310, a determination is made as to whether a user wants the "Read Mail As Plain Text" feature turned "on." If a user does not want the "Read Mail As Plain Text" feature turned "on," flow process 300 proceeds to step 314, wherein a user opens an e-mail tools options box. From step 314, the flow process 300 proceeds to decision block 315, wherein a determination is made as to whether the "Read all standard mail in plain text" box is checked (e.g., options box 22 as shown in FIG. 2). If the "Read all standard mail in plain text" box is checked, the process proceeds to step 316 (FIG. 3B). At step 316, the user removes the check from the "Read all standard mail in plain text" box. The process then proceeds to end block 317. Returning to decision block 315 (FIG. 3A), if the "Read all standard mail in plain text" box is not checked (i.e., the "Read Text as Plain Mail" feature is deactivated), the process 300 proceeds directly to end block 317 (FIG. 3B).

Returning to decision block 310 of FIG. 3A, if a user wants the "Read Mail As Plain Text" feature turned "on," flow process 300 proceeds to step 311, wherein a user opens an e-mail tools options box. From step 311, flow process 300 proceeds to decision block 312, wherein a determination is made as to whether the "Read all standard mail in plain text" box is checked. If the "Read all standard mail in plain text" box is not checked, the process proceeds to step 313 shown in FIG. 3B, wherein a user checks the "Read all standard mail in plain text" box. The process proceeds from step 313 to decision block 320. If at decision block 312 (FIG. 3A) a determination is made that the "Read all standard mail in plain text" box is checked, flow process 300 proceeds directly to decision block 320 shown in FIG. 3B.

At decision block 320, a determination is made as to whether a user wants incoming digitally signed e-mails to be read in plain text. If a user does not want to read all digitally signed mail in plain text, flow process 300 proceeds directly to end box 323. If a user does want to read all digitally signed mail in a plain text format, flow process 300 proceeds to decision block 321. At decision block 321, a determination is made as to whether the "Read all digitally signed mail in plain text" box is checked. If the "Read all digitally signed mail in plain text" box is checked at decision block 321, flow process 300 proceeds directly to end block 323. If the "Read all digitally signed mail in plain text" box is not checked at decision block 321, flow process 300 proceeds to step 322, wherein a user checks the "Read all digitally signed mail in plain text" box. Flow process 300 then proceeds from step 322 to end block 323.

II. Exemplary Steps in the Text Conversion Operation

The method of converting non-plain text formatted text to plain text formatted text may comprise one or more process steps. In one exemplary embodiment of the present invention, the method of converting text of an electronic mail to a plain text format comprises the steps of (a) determining whether text of an electronic mail message is in a format other than plain text; and (b) if the text of the electronic mail message is in a format other than plain text, converting the text to a plain text format. The method may further comprise the steps of (c) determining if the text of the electronic mail message is in a HTML format; and if the text of the electronic mail message is in a HTML format, converting the text in HTML format to plain text format. The method may also comprise the steps of determining if the text of the electronic mail message is in a RTF format, and if the text of the electronic mail message is in a RTF format, converting the text in RTF format to plain text format.

The method may further include, but is not limited to, one or more additional steps such as (i) displaying the text of the electronic mail message in a plain text format, (ii) providing a message to a user that the electronic mail message is in a format other than a plain text format, (iii) preventing immediate display of the electronic mail message, (iv) providing an option of viewing the text of the electronic mail message in a non-plain text format or a plain text format, (v) after the step of converting the text to a plain text format, providing a message to a user that the text of the electronic mail message has been converted to a plain text format, and displaying the text of the electronic mail message in a plain text format, (vi) providing a first tools option to a user, wherein the user can activate or deactivate the step of converting text of an electronic mail message to a plain text format, (vii) providing a second tools option to a user, wherein the user can activate or deactivate a step of converting text of a digitally signed electronic mail message to a plain text format, and (viii) storing the original electronic mail message prior to, during, and after a text conversion step.

Figure 4:
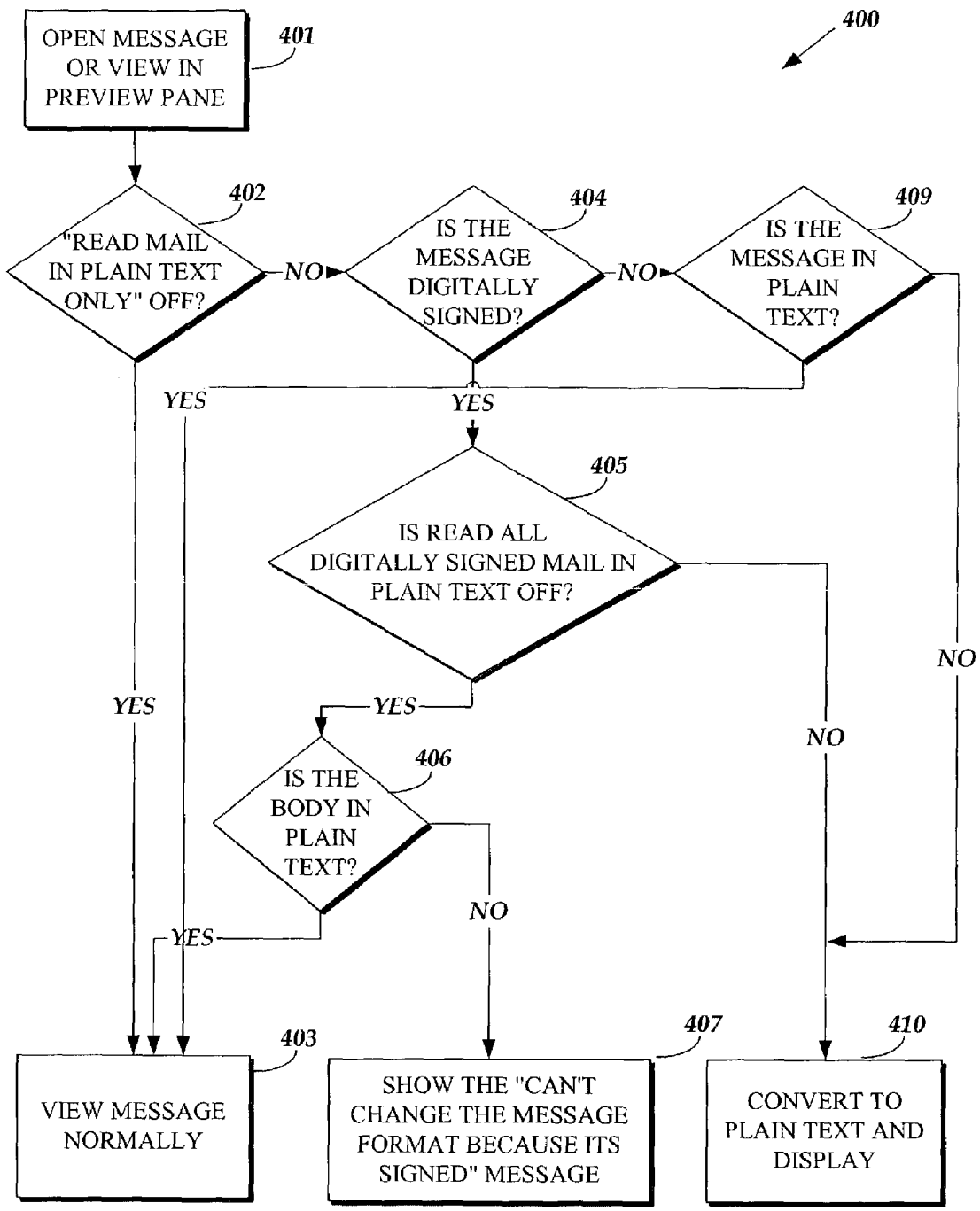
FIG. 4 is a flow diagram showing exemplary steps in a method of converting text of an electronic mail message in a non-plain text format to text in a plain text format.

One exemplary method of converting text of an electronic mail message in a non-plain text format to text in a plain text format is depicted in the flow diagram of FIG. 4. As shown in FIG. 4, flow process 400 starts at step 401. At step 401, a user opens a message or views a message in a preview pane mode. The method proceeds to decision block 402, wherein a determination is made as to whether the "Read Mail in Plain Text Only" feature is turned "off." If the "Read Mail in Plain Text only" feature is "off," the process proceeds to step 403, where the e-mail message is viewed in its original format, whether the format is in a non-plain text format or a plain text format. If a determination is made at decision block 402 that the "Read Mail in Plain Text Only" feature is "on," the process proceeds to decision block 404. At decision block 404, a determination is made as to whether the incoming message has been digitally signed. If a determination is made at decision block 404 that the incoming message has not been digitally signed, the method proceeds to decision block 409. At decision block 409, a determination is made as to whether the incoming message is in plain text. If a determination is made that the incoming message is in plain text, the method proceeds from decision block 409 to block 403, where the incoming message is viewed in its plain text format. If a determination is made that the incoming message is not in plain text, the method proceeds from decision block 409 to step 410, wherein the text of the incoming message is converted from a non-plain text format to a plain text format and then displayed.

Returning to decision block 404, if a determination is made that the incoming message is digitally signed, the method proceeds to decision block 405. At decision block 405, a determination is made as to whether the "Read All Digitally Signed Mail in Plain Text" feature is turned "off." If the "Read All Digitally Signed Mail in Plain Text"feature is "on," the method proceeds from decision block 405 to step 410, where the digitally signed message is converted from a non-plain text format to a plain text format and then displayed. If a determination is made at decision block 405 that the "Read All Digitally Signed Mail in Plain Text" feature is off, the method proceeds to decision block 406.

At decision block 406, a determination is made as to whether the text of the digitally signed message is in a plain text format. If the digitally signed e-mail message is in a plain text format, the method proceeds to block 403, where the message is viewed in its original state (i.e., in a plain text format). If a determination is made at decision block 406 that the digitally signed e-mail message is not in a plain text format, the method proceeds to step 407, where a message is displayed to a user that the body of the digitally signed e-mail message cannot be displayed. As shown in FIG. 4, one exemplary message states "Can't Change The Message Format Because It's Signed."

In this particular embodiment, a user or administrator has specifically chosen not to display the contents of digitally signed e-mail messages. Further, in this particular embodiment, a user is given the opportunity to choose whether or not to convert digitally signed messages from a non-plain text format to a plain text format by activating or deactivating the "Read All Digitally Signed Mail in Plain Text" feature at decision block 405.

Figure 5A:
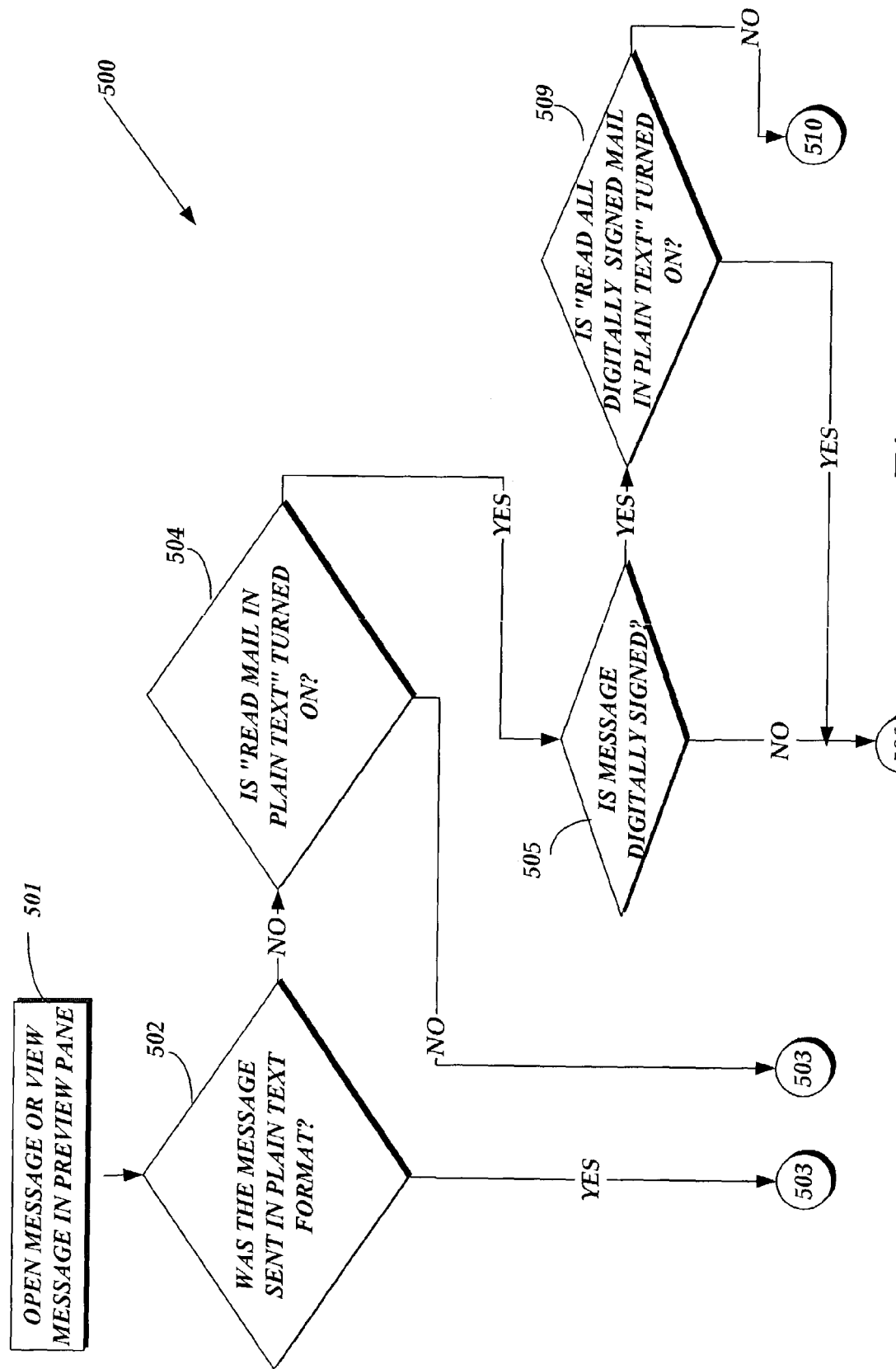
FIGS. 5A-5B depict a flow diagram showing exemplary steps in a method of converting text of an electronic mail message in a non-plain text format to text in a plain text format, wherein a computer system administrator controls administration of the text conversion method.
Figure 5B:
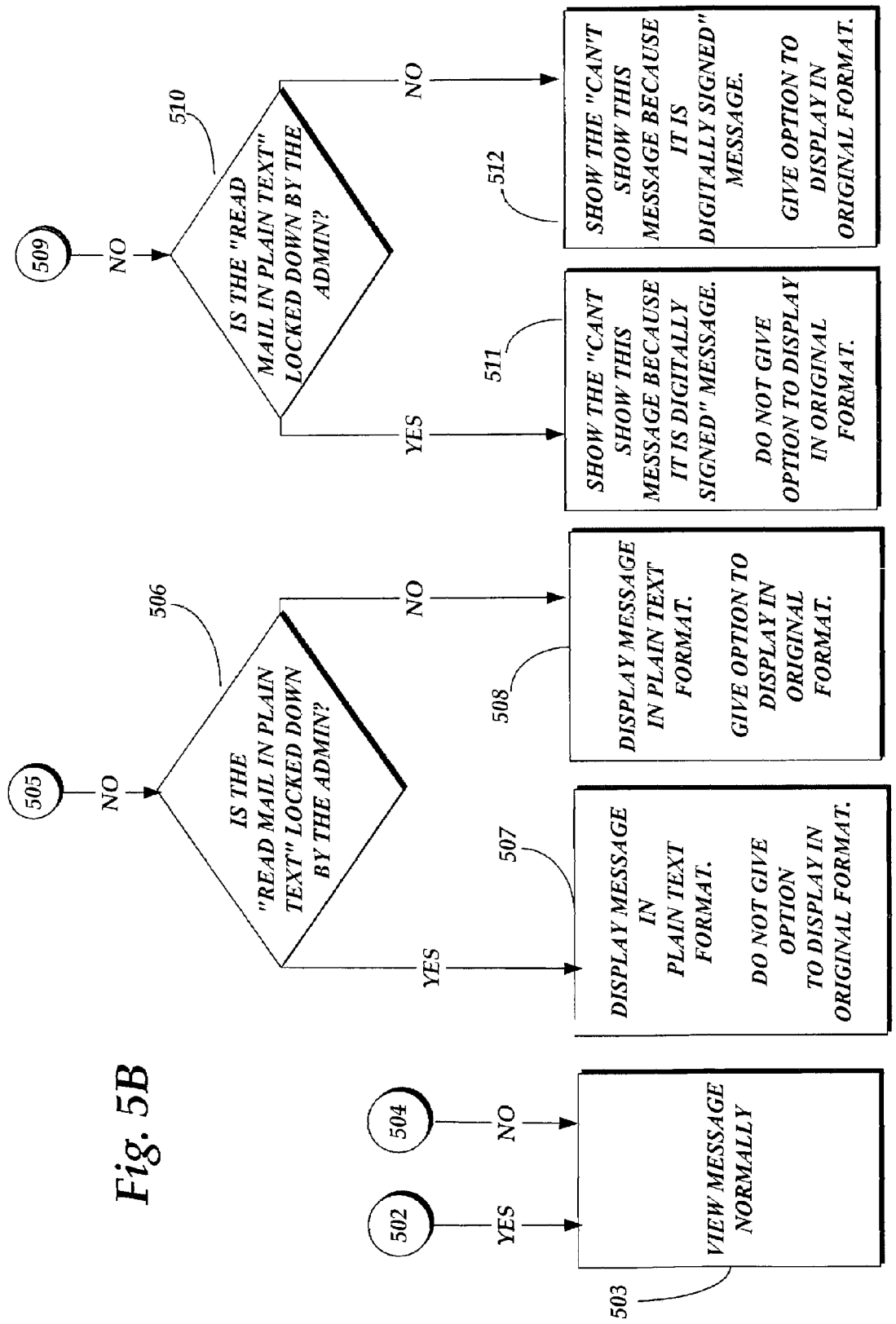

Another exemplary flow diagram showing steps in a method of converting text of an electronic mail message in a non-plain text format to text in a plain text format is show in FIGS. 5A-5B. In this particular embodiment, a computer system administrator has control over the administration of the text conversion method. As used herein, the term "administrator" refers to any entity that controls or places controls over the use of one more system features, such as the "Read Mail As Plain Text" feature of the present invention. Suitable administrators may include, but are not limited to, a company policy maker, a governmental agency policy maker, an IT (informational technology) professional, a parent, and an office administrator.

As shown in FIGS. 5A-5B, flow process 500 begins at step 501, wherein a user opens a message or views a message in a preview pane mode. The method proceeds to decision block 502, wherein a determination is made as to whether the message was sent in a plain text format. If a determination is made that the incoming message was sent in a plain text format, the method proceeds from decision block 502 to step 503 (FIG. 5B), wherein the message is viewed in its normal state (i.e., in a plain text format).

At decision block 502 shown in FIG. 5A, if a determination is made that the incoming message was sent in a non-plain text format, the method proceeds to decision block 504, wherein a determination is made as to whether the "Read Mail in Plain Text" feature is turned "on." If the "Read Mail in Plain Text" feature is not turned "on," the method proceeds from decision block 504 to step 503 (FIG. 5B), wherein the message is viewed in its normal state (i.e., in a non-plain text format). If a determination is made that the "Read Mail in Plain Text" feature is turned "on," the method proceeds from decision block 504 to decision block 505. At decision block 505, a determination is made as to whether the incoming message is digitally signed. If the incoming message is not a digitally signed message, the method proceeds from decision block 505 to decision block 506 (FIG. 5B). If a determination is made at decision block 505 that the incoming message is a digitally signed message, the method proceeds to decision block 509, wherein a determination is made as to whether the "Read All Digitally Signed Mail In Plain Text" feature is turned "on." If a determination is made at decision block 509 that the "Read All Digitally Signed Mail In Plain Text" feature is turned "on," the method also proceeds to decision block 506 (FIG. 5B).

At decision block 506 as shown in FIG. 5B, a determination is made as to whether the "Read Mail As Plain Text" feature is locked down (i.e., locked in an "on" or activated position) by the administrator. If a determination is made that the "Read Mail As Plain Text" feature is locked down by the administrator, the method proceeds to step 507, wherein the message is displayed in a plain text format. In this particular embodiment, the method does not provide an option to display the message in its original format (i.e., in a non-plain text format).

If a determination is made at decision block 506 that the "Read Mail As Plain Text" feature is not locked down by the administrator, the method proceeds to block 508, wherein the message is displayed in a plain text format. In this particular embodiment, the method does provide an option to display the message in its original format (i.e., in a non-plain text format).

Returning to decision block 509 as shown in FIG. 5A, if a determination is made that the "Read All Digitally Signed Mail In Plain Text" feature is not turned "on" (e.g., this feature is "off"), the method proceeds from decision block 509 to decision block 510 as shown in FIG. 5B. At decision block 510, a determination is made as to whether the "Read Mail As Plain Text" feature is locked down by the administrator. If a determination is made that the "Read Mail As Plain Text" feature has been locked down by the administrator, the method proceeds to step 511, wherein a message is provided to the user indicating that the contents of the message cannot be displayed because it is a digitally signed message. One exemplary message is shown in step 511 and is entitled "Can't show this message because it is digitally signed." In this embodiment, the method does not provide an option to display the digitally signed message in its original format (i.e., in a non-plain text format).

If a determination is made at decision block 510 that the "Read Mail As Plain Text" feature is not locked down by the administrator, the method proceeds to step 512, wherein a message is provided to a user as described in step 511. However, in this particular embodiment, the method does provide an option to display the digitally signed message in its original format (i.e., in a non-plain text format).

III. User Interface with the Text Conversion Method

As described above, the method of converting text of an electronic mail to a plain text format may provide one or more messages to a user, as well as, options to enable a user to activate or deactivate the "Read Mail As Plain Text" feature of the present invention. The method of the present invention may provide one or more messages to a user as shown in the exemplary screen shots provided in FIGS. 6-7.

Figure 6:
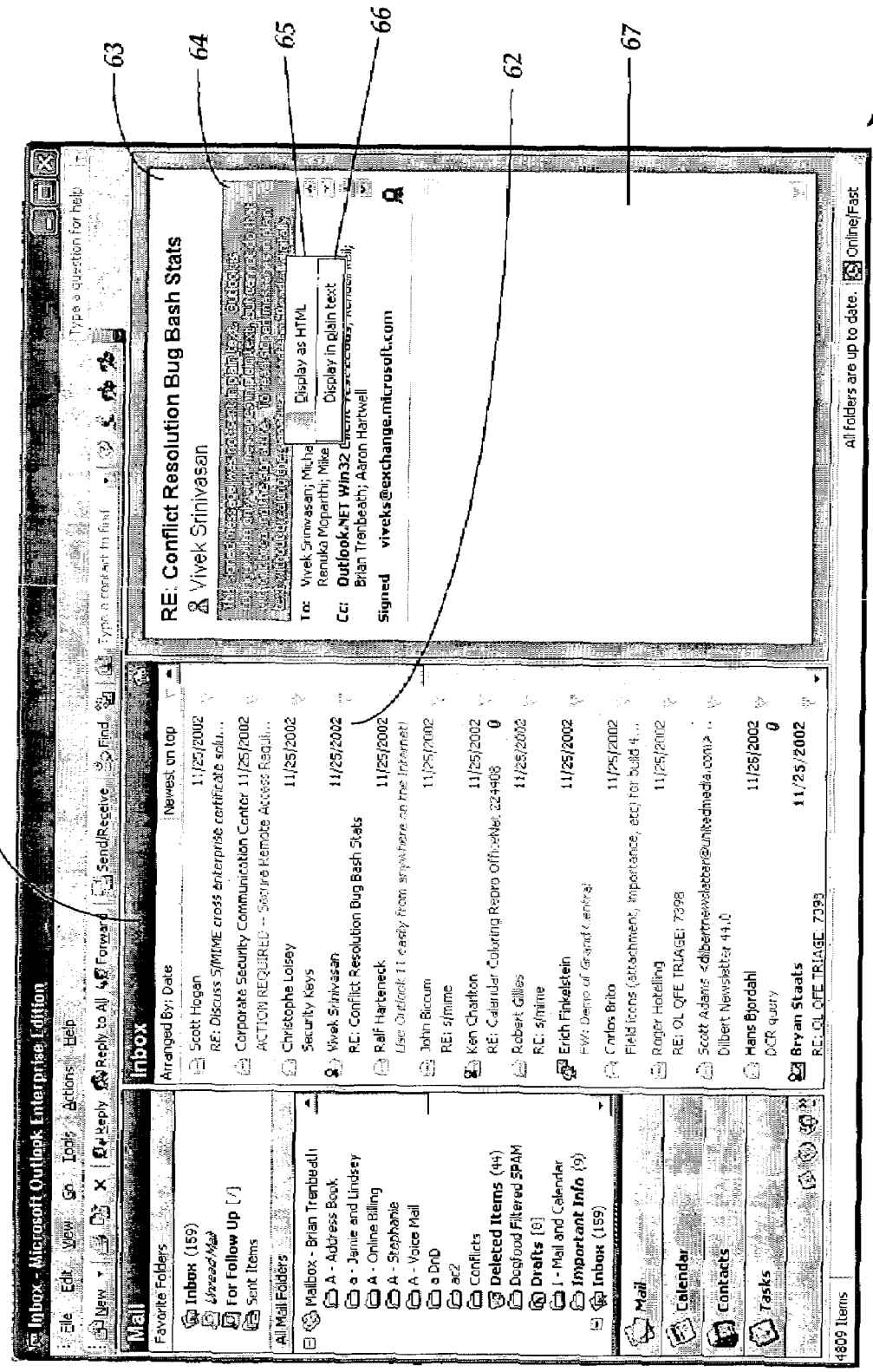
FIG. 6 depicts an exemplary screen shot informing a user that the electronic mail system is configured to only receive mail in a plain text format.

As shown in FIG. 6, exemplary screen shot 60 provides details of a page from the Microsoft Outlook® application. Screen shot 60 provides the following features: inbox 61, which provide a list of e-mails received by the inbox; preview pane 63; message 64; first option box 65; second option box 66; and e-mail body display area 67. Highlighted e-mail message 62 provides the following message 64 within preview pane 63:

This signed message was not sent in plain text. Microsoft's Outlook® application is configured to only view messages in plain text, but cannot do that without breaking the signature. To read signed messages in plain text without breaking the signature, select the "Read all digitally signed mail in plain text" feature.

In this particular embodiment of the present invention, the electronic mail system is only configured to receive messages in a plain text format. In addition, the "Read all digitally signed mail in plain text" feature has not been activated by a user or an administrator. Further, in this embodiment, a user is provided with an option to display the digitally signed message in plain text as shown in second options box 66. This particular embodiment also provides an option to a user to display the digitally signed message in its original non-plain text format, for example, in HTML format in this particular case, as shown in first options box 65.

Figure 7:
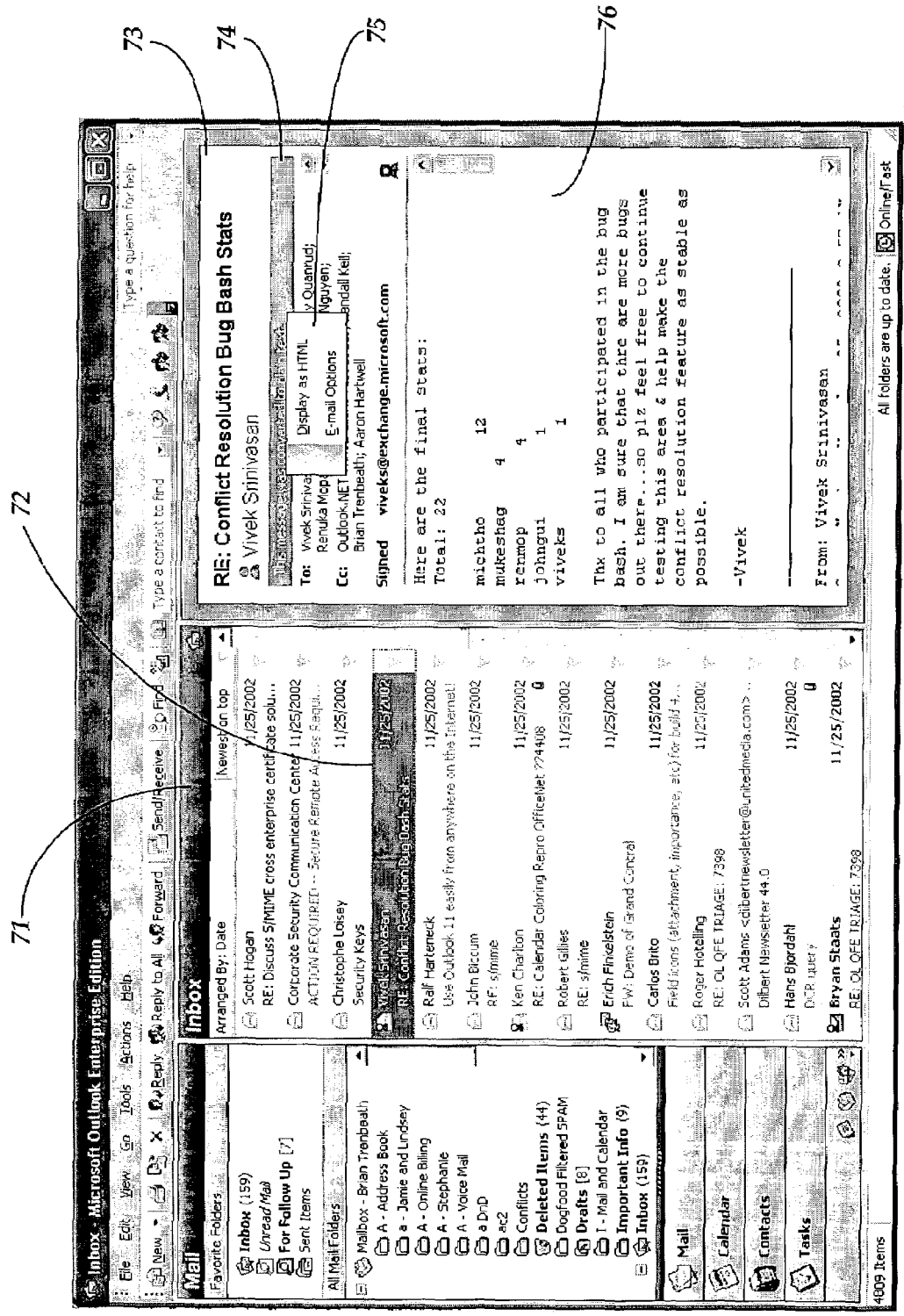
FIG. 7 depicts an exemplary screen shot informing a user that the text of a received electronic mail message has been converted to a plain text format.

Another exemplary screen shot is depicted in FIG. 7. As shown in FIG. 7, exemplary screen shot 70 provides the following feedback to a user: a list of incoming e-mails in inbox 71, preview pane 73, message 74, option box 75, and body text display 76. Highlighted e-mail message 72 within inbox 71 provides the following message 74 to a user: "This message was converted to plain text." In this particular embodiment, the "Read Mail As Plain Text" feature has been activated, and the "Read all digitally signed messages in plain text" feature has been selected. Further, in this embodiment, a user is given the option to view the digitally signed message in its original format, HTML format, as show in option box 75. By clicking on the top line, entitled "Display as HTML," the user is able to view the message in its original format, an HTML format in this. By clicking on the second line, entitled "Email Options," the user is returned to the Tools|Options page in Microsoft's Outlook® application, where the user can reconfigure settings for the "Read Mail as Plain Text" feature if so desired.

The present invention is also directed to a computer readable medium having stored thereon computer-executable instructions for performing a method of converting electronic mail to a plain text format, wherein the method comprises (a) determining whether text of an electronic mail is in a format other than plain text; and (b) if the text of the electronic mail is in a format other than plain text, converting the text to a plain text format. In addition, the present invention is directed to a computing system containing at least one application module usable on the computing system, wherein the at least one application module comprises application code for performing the above-described method of converting electronic mail to a plain text format.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A computer implemented method of converting text of an electronic mail message to a plain text format, the method comprising:
    determining that the text of the electronic mail message is in a format other than plain text, the electronic mail message being received by a recipient from a sender;
    determining, in response to determining that the text of the electronic mail message is in the format other than plain text, that the electronic mail message includes a digital signature;
    sending, in response to determining that the electronic mail message includes the digital signature, a preview message indicating that the electronic mail message cannot be converted to the plain text format without breaking the digital signature;
    determining that an email viewer application is configured to only view messages in the plain text format;
    displaying, in response to determining that the email viewer application is configured to only view messages in the plain text format, a message indicating that the electronic mail message cannot be displayed without breaking the digital signature;
    receiving, in response to displaying the message indicating that the electronic mail message cannot be displayed without breaking the digital signature, instructions from a user to convert the electronic mail message to the plain text format in order to view the electronic mail message; and
    converting, in response to the received instructions, the text of the electronic mail message to the plain text format when the text of the electronic mail message is in the format other than plain text wherein converting the text of the electronic mail message to the plain text format comprises converting the text of the electronic mail message and breaking the digital signature.

2. The method of claim 1, further comprising:
    when the text of the electronic mail message is in a hypertext markup language (HTML) format, converting the text in an HTML format to plain text format; and
    when the text of the electronic mail message is in a rich text format (RTF), converting the text in the RTF to plain text format.

3. The method of claim 2, further comprising
    providing an option of viewing the text of the electronic mail message in one of the following: an HTML format and a plain text format, when the text of the electronic mail message is in the HTML format; and
    providing an option of viewing the text of the electronic mail message in one of the following: a RTF and a plain text format, when the text of the electronic mail message is in the RTF.

4. The method of claim 1, further comprising
    displaying the text of the electronic mail message in the plain text format.

5. The method of claim 1, further comprising
    when attempting to preview or open an electronic mail message having text in a format other than plain text,
    providing a message to a user that the electronic mail message is in a format other than plain text format; and
    preventing immediate display of the electronic mail message.

6. The method of claim 5, further comprising providing an option of viewing the text of the electronic mail message in one of the following: a non-plain text format and a plain text format.

7. The method of claim 1, further comprising
    after the step of converting the text to a plain text format,
    providing a message to a user that the text of the electronic mail message has been converted to plain text format; and
    displaying the text of the electronic mail message in plain text format.

8. The method of claim 7, further comprising
    providing an option of viewing the text of the electronic mail message in a non-plain text format.

9. The method of claim 1, further comprising
    providing a first tools option to a user, wherein the user can activate or deactivate the step of converting text of the electronic mail message to a plain text format.

10. The method of claim 9, further comprising
    providing a second tools option to a user, wherein the user can activate or deactivate a step of converting text of a digitally signed electronic mail message to a plain text format.

11. A computer readable medium having stored thereon computer-executable instructions for performing a method of converting text of an electronic mail message to a plain text format, said method comprising:

determining that the text of the electronic mail message is in the format other than plain text, the electronic mail message being received by a recipient from a sender;

determining, in response to determining that the text of the electronic mail message is in the format other than plain text, that the electronic mail message includes a digital signature;

sending, in response to determining that the electronic mail message includes the digital signature, a preview message indicating that the electronic mail message cannot be converted to the plain text format without breaking the digital signature;

determining that an email viewer application is configured to only view messages in the plain text format;

displaying, in response to determining that the email viewer application is configured to only view messages in the plain text format, a message indicating that the electronic mail message cannot be displayed without breaking the digital signature;

receiving, in response to displaying the message indicating that the electronic mail message cannot be displayed without breaking the digital signature, instructions from a user to convert the text of the electronic mail message to the plain text format in order to view the electronic mail message; and converting, in response to the received instructions, the text of the electronic mail message to the plain text format when the text of the electronic mail message is in the format other than plain text wherein converting the text of the electronic mail message to the plain text format comprises converting the text of the electronic mail message and breaking the digital signature.

12. The computer readable medium of claim 11, further comprising:
when the text of the electronic mail message is in a hypertext markup language (HTML) format, converting the text in an HTML format to plain text format; and
when the text of the electronic mail message is in a rich text format (RTF), converting the text in the RTF to plain text format.

13. The computer readable medium of claim 12, further comprising
providing an option of viewing the text of the electronic mail message in one of the following: an HTML format and a plain text format, when the text of the electronic mail message is in the HTML format; and
providing an option of viewing the text of the electronic mail message in one of the following: an RTF and the plain text format when the text of the electronic mail message is in RTF.

14. The computer readable medium of claim 11, further comprising
displaying the text of the electronic mail message in the plain text format.

15. The computer readable medium of claim 11, further comprising
when attempting to preview or open an electronic mail message having text in a format other than plain text,
providing a message to a user that the electronic mail message is in a format other than plain text format; and
preventing immediate display of the electronic mail message.

16. The computer readable medium of claim 15, further comprising
providing an option of viewing the text of the electronic mail message in a non-plain text format or a plain text format.

17. The computer readable medium of claim 11, further comprising
after the step of converting the text to a plain text format,
providing a message to a user that the text of the electronic mail message has been converted to plain text format; and
displaying the text of the electronic mail message in plain text format.

18. The computer readable medium of claim 17, further comprising
providing an option of viewing the text of the electronic mail message in a non-plain text format.

19. The computer readable medium of claim 11, further comprising
providing a first tools option to a user, wherein the user can activate or deactivate the step of converting text of the electronic mail message to a plain text format.

20. The computer readable medium of claim 19, further comprising
providing a second tools option to a user, wherein the user can activate or deactivate a step of converting text of a digitally signed electronic mail message to a plain text format.

21. A system for converting text of an electronic mail message to a plain text format, the system comprising:
a memory storage; and
a processing unit coupled to the memory storage, wherein the processing unit is operative to:
determine the text of the electronic mail message is in the format other than plain text;
determine, in response to determining the text of the electronic mail message is in a format other than plain text, the electronic mail message includes a digital signature;
send, in response to determining the electronic mail message includes the digital signature, a preview message indicating that the electronic mail message cannot be converted to the plain text format without breaking the digital signature;
determine that an email viewer application is configured to only view messages in the plain text format;
display, in response to determining that the email viewer application is configured to only view messages in the plain text format, a message indicating that the electronic mail message cannot be displayed without breaking the digital signature;
receive, in response to displaying the message indicating that the electronic mail message cannot be displayed without breaking the digital signature, instructions from a user to convert the text of the electronic mail message to the plain text format in order to view the electronic mail message; and
convert, in response to the received instructions, the text of the electronic mail message to the plain text format when the text of the electronic mail message is in the format other than plain text wherein the processing unit being operative to convert the text of the electronic mail message to the plain text format comprises the processing unit being operative to convert the text of the electronic mail message to the plain text format and breaking the digital signature.

22. The system of claim 21, wherein the processing unit is further operative to:

when the text of the electronic mail message is in a hypertext markup language (HTML) format, convert the text in the HTML format to plain text format; and when the text of the electronic mail message is in a rich text format (RTF), convert the text in the RTF to plain text format.

23. The system of claim 22, wherein the processing unit is further operative to:
provide an option of viewing the text of the electronic mail message in one of the following: an HTML format and a plain text format, when the text of the electronic mail message is in the HTML format; and
provide an option of viewing the text of the electronic mail message in one of the following: an RTF and a plain text format, when the text of the electronic mail message is in the RTF.

24. The system of claim 21, wherein the processing unit is further operative to display the text of the electronic mail message in the plain text format.

25. The system of claim 21, wherein the processing unit is further operative to, when attempting to one of the following: preview an electronic mail message having text in a format other than plain text and open the electronic mail message having text in the format other than plain text:
provide a message to a user that the electronic mail message is in a format other than plain text format; and
prevent immediate display of the electronic mail message.

26. The system of claim 25, wherein the processing unit is further operative to provide an option of viewing the text of the electronic mail message in one of the following: a non-plain text format and a plain text format.

27. The system of claim 21, wherein the processing unit is further operative to:
provide a message to a user that the text of the electronic mail message has been converted to plain text format after the processing unit converts the text to a plain text format; and
display the text of the electronic mail message in plain text format.

28. The system of claim 27, wherein the processing unit is further operative to provide an option of viewing the text of the electronic mail message in a non-plain text format.

29. The system of claim 21, wherein the processing unit is further operative to provide a first tools option to a user, wherein the user can activate or deactivate converting text of the electronic mail message to a plain text format.

30. The system of claim 29, wherein the processing unit is further operative to provide a second tools option to a user, wherein the user can activate or deactivate converting text of a digitally signed electronic mail message to a plain text format.

* * * * *